US008009816B2

(12) United States Patent
Syrjälä et al.

(10) Patent No.: US 8,009,816 B2
(45) Date of Patent: Aug. 30, 2011

(54) ARRANGING SUBSCRIBER BILLING IN TELECOMMUNICATION SYSTEM (75) Inventors: Jari Syrjälä, Espoo (FI); Juha-Pekka Koskinen, Heinajoenkatu (FI); Juha Vallinen, Tarmonkato (FI)

(73) Assignee: Nokia Corporation, Espoo (FI)

( * ) Notice: Subject to any disclaimer, the term of this patent is extended or adjusted under 35 U.S.C. 154(b) by 393 days.

(21) Appl. No.: 10/296,477

(22) PCT Filed: May 23, 2001

(86) PCT No.: PCT/FI01/00501
§ 371 (c)(1),
(2), (4) Date: Apr. 8, 2003

(87) PCT Pub. No.: WO01/91445
PCT Pub. Date: Nov. 29, 2001

(65) Prior Publication Data
US 2003/0165222 A1 Sep. 4, 2003

(30) Foreign Application Priority Data

May 25, 2000 (FI) ..................................... 20001258
Sep. 20, 2000 (FI) ..................................... 20002078

(51) Int. Cl.
H04M 15/00 (2006.01)
H04M 11/00 (2006.01)
(52) U.S. Cl. ......... 379/115.03; 379/114.06; 379/127.01; 455/406
(58) Field of Classification Search ............. 379/112.01, 379/114.01, 114.02, 114.06, 114.1, 114.12, 379/114.15–114.2, 115.01, 120, 121.02, 379/126, 127.01, 127.03, 133–134
See application file for complete search history.

(56) References Cited

U.S. PATENT DOCUMENTS 5,463,683 A * 10/1995 Collins et al. ............ 379/210.02
5,793,853 A    8/1998 Sbisa
5,796,790 A *  8/1998 Brunner .................. 455/406

(Continued)

FOREIGN PATENT DOCUMENTS

DE     198 13 906 A1    9/1999

(Continued)

OTHER PUBLICATIONS

Tariff-Definitions from Dictionary.com, obtained online on Jan. 20, 2007.*

(Continued)

Primary Examiner — Quoc D Tran
(74) Attorney, Agent, or Firm — Alston & Bird LLP (57) ABSTRACT The invention relates to a method and a system implementing the method for arranging subscriber billing in a multi-provider environment wherein a subscriber desiring a service uses both a first network (A) and a second network (T). In order to bill the subscriber, either a tariff of the second network (T) is transmitted to the first network (A), a tariff of the first network is combined with the tariff of the second network and the subscriber is billed according to the combined tariff, or a billing identifier is generated in the first network (A) to be transmitted to the second network (T), the billing identifier is attached to billing information in both networks and the pieces of the billing information that comprise the same billing identifier are combined in order to bill the subscriber. The invention thus enables a subscriber in a multi-provider environment to be billed using a single bill.

24 Claims, 3 Drawing Sheets

U.S. PATENT DOCUMENTS

| | | | | |
|---|---|---|---|---|
| 5,809,121 A * | 9/1998 | Elliott et al. | | 379/127.01 |
| 5,835,580 A | 11/1998 | Fraser | | |
| 5,991,375 A * | 11/1999 | Stahl et al. | | 379/112.05 |
| 5,991,616 A | 11/1999 | Mirza et al. | | |
| 5,995,822 A * | 11/1999 | Smith et al. | | 455/406 |
| 6,064,666 A * | 5/2000 | Willner et al. | | 370/352 |
| 6,208,851 B1 * | 3/2001 | Hanson | | 455/405 |
| 6,263,058 B1 | 7/2001 | Lautenschlager et al. | | |
| 6,298,127 B1 * | 10/2001 | Petrunka | | 379/126 |
| 6,307,924 B1 * | 10/2001 | Rosenberg | | 379/115.01 |
| 6,408,173 B1 * | 6/2002 | Bertrand et al. | | 455/406 |
| 7,035,619 B1 * | 4/2006 | Fargano et al. | | 455/406 |

FOREIGN PATENT DOCUMENTS

| | | | |
|---|---|---|---|
| DE | 198 40 910 A1 | | 3/2000 |
| EP | 0 905 961 A2 | | 3/1999 |
| EP | 1 014 619 A1 | | 6/2000 |
| GB | 2 342 006 A | | 3/2000 |
| GB | 2 352 935 A | | 2/2001 |
| JP | 64-057864 | | 3/1989 |
| JP | 01057864 A | | 3/1989 |
| JP | 08191355 A | | 7/1996 |
| JP | 01-115260 | | 5/1999 |
| JP | 11-196477 | | 7/1999 |
| JP | 2000-101754 | | 4/2000 |
| WO | 96/31072 | | 10/1996 |
| WO | WO 97/23102 | | 6/1997 |
| WO | WO 97/24007 | | 7/1997 |
| WO | WO 9724007 A1 * | | 7/1997 |
| WO | WO 98/11712 | | 3/1998 |
| WO | WO 98/27715 | | 6/1998 |
| WO | 00/08821 | | 2/2000 |
| WO | WO 00/05871 | | 2/2000 |
| WO | WO 00/11859 | | 3/2000 |
| WO | WO 00/16579 | | 3/2000 |
| WO | WO 00/24161 | | 4/2000 |
| WO | WO 00/69118 | | 11/2000 |
| WO | WO 00/69201 | | 11/2000 |

OTHER PUBLICATIONS

European Communication pursuant to Article 96(2) EPC dated Jul. 9, 2007.
Japanese Communication Translation, Dispatch No. 463057, dated Sep. 17, 2007 (2 pages).
Official Communication issued in the corresponding Canadian Application No. 2,410,491, dated May 2, 2008.
Chinese Office Action for Application No. 01810044.9 dated Nov. 21, 2008.
Japanese Office Action for Application No. 2006-043616 dated Mar. 23, 2009.
Japanese Office Action for Application No. 2001-586905 dated Aug. 22, 2005.
International Search Report for PCT/FI01/00501 dated Sep. 14, 2001.
International Preliminary Examination Report for PCT/FI01/00501 dated Aug. 20, 2002.
Japanese Office Action for Application No. 20065-043616 dated Oct. 29, 2009.

* cited by examiner

ARRANGING SUBSCRIBER BILLING IN TELECOMMUNICATION SYSTEM

BACKGROUND OF THE INVENTION

The invention relates to billing a subscriber in a telecommunication system, and particularly to billing a subscriber in a multi-provider environment in a mobile communication system. The mobile communication system generally refers to any telecommunication system which enables wireless communication when users move in the service area of the system. A typical mobile communication system is a public land mobile network PLMN.

Telecommunication systems are increasingly changing over to a multi-provider environment wherein access is provided by an access operator, telephony by a telephony operator and actual services by one or more service providers. This is the case particularly in systems called third generation mobile communication systems, such as a universal mobile communications system UMTS. In the UMTS, for example, the actual mobile communication network can operate as an access network providing the user with wireless access to external networks, such as Internet protocol IP networks and the services thereof, such as IP telephony IPT. One access network usually provides access to several external networks, which can be of a similar type. There can be several telephony operators, for example, which provide the IPT service. When the access operator is not the telephony operator, both operators typically collect their billing information in their own networks and bill the subscriber separately. A service provider itself does not maintain the network but purchases a necessary network service from the network operator, which collects billing information on behalf of the service provider as if it were the network operator's own billing information. The network operator also bills the subscriber on behalf of the service provider. In other words, if the service provider purchases the network service from the access operator, the access operator is responsible for collecting the billing information on the service and for billing according to an agreed tariff. The telephony operator operates in a similar manner if the service provider should purchase the network service from the telephony operator.

A service of the mobile communication systems becoming increasingly popular is a prepaid subscription. The prepaid subscription involves no billing in arrears but the account of the prepaid subscription is charged in real time during calls. The prepaid subscription can usually be used for chargeable calls until the credits in the subscription's account run out, in other words until the prepaid amount has been exhausted. Usually, the subscriber to the subscription, or someone else, can deposit more money in the subscription's account.

The problem is, however, how to implement a prepaid subscription which requires real-time billing during a call in a system comprising an access operator and a telephony operator, which both collect their own billing information and do not know each other's tariffs. For an end user, it is inconvenient if he or she is compelled to have at least two separate prepaid subscriptions, one being a subscription to the access operator and the other to the telephony operator. The same problem also arises in connection with a service similar to the prepaid subscription wherein the maximum amount of a bill, i.e. the maximum sum of money that a bill is allowed to be during a billing period, has been determined for a subscription to be billed in arrears.

It would also be more convenient for subscribers billed "normally" in arrears to receive a single combined bill instead of separate bills sent by the operators.

BRIEF DESCRIPTION OF THE INVENTION

An object of the invention is thus to provide a method and an apparatus implementing the method so as to alleviate the above-mentioned problems.

The objects of the invention are achieved by the method and telecommunication system which are characterized by what is disclosed in the independent claims. Preferred embodiments of the method and system of the invention are disclosed in the attached dependent claims.

The idea underlying the invention is that information is transmitted from a first network (e.g. a network of a telephony operator or an access operator) to a network of a second operator to enable joint billing. An advantage of the invention is that a subscriber is billed in a centralized manner such that e.g. only a single prepaid subscription will suffice while the operators are still allowed to set their own prices for their services independently of each other. A further advantage of the invention is that it enables a prepaid subscription or a balance-limited subscription to be paid in arrears to be implemented also in a multi-provider environment such that the subscriber only needs a single subscription while the operators are still allowed to set their own prices for their services independently of each other. A still further advantage of the invention is that it is possible to provide both a user of a prepaid subscription- and a user of a balance-limited subscription with the same alternatives to choose a telephony operator in a multi-provider environment as conventional subscribers (i.e. those to be billed normally in arrears).

In a first preferred embodiment of the invention, in a network of a telephony operator, a subscriber is identified as a joint billing subscriber, i.e. e.g. as a subscriber who has a prepaid subscription to an access network or as a subscriber to be billed in arrears, who wants to receive, a single bill. When the subscriber has been identified as a joint billing subscriber, the tariff of the telephony operator is transmitted to the network node of the access operator which is responsible for billing. The network node combines the telephony operator's tariff and the access operator's tariff and charges e.g. the account of the prepaid subscription according to the combined tariff. A further advantage of the embodiment is that it enables a prepaid subscription and an account of a balance-limited subscription to be paid in arrears to be charged in real time using an extremely light signaling load.

In a second and a third preferred embodiments of the invention, a globally unique billing identifier is generated in the network node of the access network, and the billing identifier is transmitted to the network nodes which collect billing information, regardless of the network node being a network node of the access network or the telephony operator. The identifier enables a billing center responsible for billing to combine the billing information received from different operators. A further advantage of these embodiments is that they inevitably take into account all special events affecting a billing procedure.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

The present invention can be applied to any telecommunication system wherein information necessary for billing a subscriber exists in at least two different networks. Such systems include systems called third generation mobile communication systems, such as the universal mobile telecommunications system UMTS and IS-41, and mobile communication systems similar to the GSM system, such as a GSM 1800 and systems based on the aforementioned systems, such as GSM 2+ systems. The invention can also be applied to fixed systems wherein two separate operators can operate. The invention will be described in the following using a 3GPP AII-IP system, i.e. an UMTS system based on IP technology and specified in a $3^{rd}$ generation partnership project 3GPP, as an exemplary system, without restricting the invention thereto. The specifications of mobile communication systems, and those of the third generation mobile communication systems in particular, are advancing rapidly; consequently, the invention may require additional changes. All words and expressions should therefore be interpreted broadly since they are only intended to illustrate, not to restrict, the invention. The essential point for the invention is the function, not the network node in which the function is located.

Figure 1:
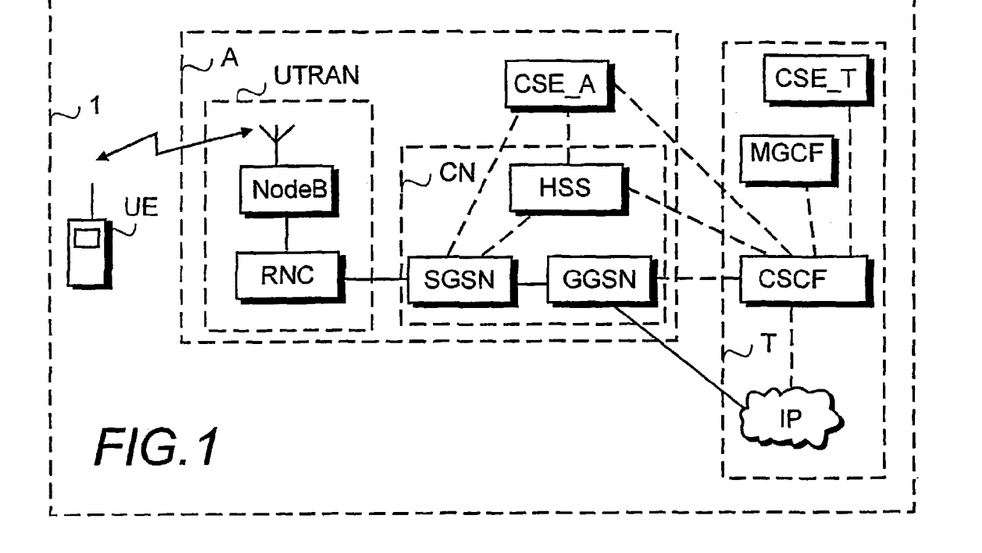
FIG. 1 shows elements of a UMTS system relevant to the invention.

FIG. 1 shows a simplified network architecture, describing only some of the elements of a system architecture. The network nodes illustrated in FIG. 1 are logical units, the implementation of which may differ from the described one. It is obvious to one skilled in the art that the system may also comprise other functions and structures which need not be described in closer detail here. In FIG. 1, the broken lines between network nodes denote signaling connections while the unbroken lines denote signaling and data transmission links.

In a 3GPP AII-IP system 1, an access layer A and a telephony layer T will be separated, and both can have operators of their own. The system 1 comprises at least one of the both layers. Within the scope of the present invention, an access layer corresponds to an access network of an access operator and a telephony layer corresponds to a telephone network of a telephony operator. Usually, when not roaming, a subscriber always uses the same access operator while he or she may select the telephony operator to be used. As far as the invention is concerned, the structure of the access layer and the telephony layer is irrelevant. The 3GPP AII-IP system is based on a GPRS service of the pan-European global system for mobile communications GSM system and an intelligent network service implementation according to a customised applications for mobile network enhanced logic CAMEL architecture. The GPRS and the CAMEL are GSM 2+ phase services.

User equipment UE comprises an actual terminal and an identification card USIM, also called a subscriber identification unit, detachably connected thereto. In this connection, the user equipment UE generally refers to a unity comprising the actual terminal and the subscriber identification unit. The subscriber identification unit USIM is a smart card which comprises subscriber identity and which performs authentication algorithms and stores authentication and cipher keys and subscription information necessary at the user equipment. The actual terminal can be any equipment capable of communicating in a mobile communication system. The terminal can thus be a simple terminal for speech only, or it can be a terminal for various services, operating as a service platform and supporting loading and carrying out different service-related functions. The terminal can also be a combination of several different devices, for example a multimedia computer with a Nokia card phone connected thereto to provide a mobile connection.

In the first preferred embodiment of the invention according to FIG. 1, the telephony layer T comprises, in addition to the actual IP network IP, a call state control function CSCF, a media gateway control function MGCF and an execution environment CSE_T corresponding to a service control point in an intelligent network.

The CSCF controls call establishment and is responsible for routing, and comprises, for example, a function corresponding to a switching function in an intelligent network. The CSCF provides IP telephony services with end-to-end control. Signaling associated with the IP telephony, such as H.323 and SIP, terminates at the user equipment and the CSCF. In other words, the CSCF is the network node in which IP telephony user equipment are registered and via which the signaling is transferred. The CSCF comprises IP telephony call state models, which are used for controlling call establishment with other network nodes, such as the service control point CSE_T. The CSCF can also communicate with IP telephony application servers (not shown in FIG. 1). The CSCF comprises a subscriber database, which logically corresponds to a visitor location register in the GSM system. The CSCF is responsible for producing both telephony billing information and service billing information. The telephony billing information is used, according to the billing policy and mechanisms specified by the IP telephony network operator, for billing for the use of basic telephony, different data bearers and additional services. The service billing information is generated by the service provider. Service billing is carried out on a pay-by-use basis and calculated according to a contract between the service provider and the subscriber. Both billing procedures are preferably controlled by the service control function in the intelligent network or methods determined by open interfaces (OSA, Parlay).

In the first preferred embodiment of the invention, the service control function CSE_T of the IP telephony operator controls billing in the IP telephony network T. In addition, it may control call establishment in an intelligent-network-like manner. The service control function CSE_T may comprise all service logic and control associated with billing and different services, and necessary databases or a connection to the databases. The service control function is only a logical function and it can be internally implemented in different ways. An alternative is that it is internally decentralized and the related service logic can be decentralized in different nodes. Also the service information can be decentralized in different nodes from the service logic.

The MGCF is an example of new network nodes provided in the network of the telephony operator. The MGCF mainly collects information on data amounts transmitted on the physical connection since the CSCF knows nothing about them.

In the first preferred embodiment of the invention, the main parts of the access layer A are: a core network CN, a UMTS terrestrial radio access network UTRAN and a camel service environment CSE_A, which corresponds to a service point in an intelligent network.

The UTRAN comprises a number of radio network subsystems (not shown in the figure) connected to the core network CN. A radio network sub-system comprises a radio network controller RNC and one or more B nodes nodeB. The radio network controller RNC is a network node responsible for controlling UTRAN radio resources. It corresponds logically to a base station controller in the GSM system. In each connection between the user equipment UE and the UTRAN, one RNC is a serving RNC. The main task of the B node nodeB is to process (channel coding and multiplexing, rate adjustment, decoding, etc.) a layer 1 of an air interface. It also carries out some management operations of the basic radio resource, such as controlling inner circuit power. The B node nodeB corresponds logically to a base station in the GSM system.

The core network CN can be connected to external networks, such IP networks IP. In the example of FIG. 1, the core network CN comprises a serving general packet radio service GPRS support node SGSN, a gateway GPRS support node GGSN and a home subscriber server HSS. Core networks of another type, such as IS-41, may comprise other network nodes.

The support nodes SGSN and GGSN are usually interconnected by a backbone network (not shown in the figure). It is to be noted that the SGSN and GGSN functionalities can also be physically connected to the same network node, in which case the backbone network of the operator is unnecessary. Logically, however, the nodes are different nodes. The IP telephony is in practice invisible to the elements of the core network. For the support nodes SGSN and GGSN, the IP telephony is only a PDP context, i.e. a transmission link, with certain service quality requirements. The signaling associated with the IP telephony usually terminates at the user equipment and the CSCF, so there is no need for the SGSN or GGSN to understand it.

The serving GPRS support node SGSN is a node which serves the user equipment UE located in its area. In a packet radio network of the cellular type, each support node SGSN provides mobile data terminals, i.e. the user equipment UE, with packet data service in the area of one or more cells in its service area. The SGSN can participate in collecting billing information in the access network. The SGSN according to the first preferred embodiment of the invention comprises a function similar to the service switching function in an intelligent network.

The GPRS gateway support nodes GGSN connect the operator to systems external to the GPRS network, such as the IP network IP. The GGSN can also be connected directly to a private company network or a host. The GGSN operates as a router between an external address and internal routing data (e.g. SGSN). The GGSN can participate in collecting the billing information of the access network.

The home subscriber server HSS logically corresponds to the home location register in the GSM system, subscriber information for each subscriber being stored therein permanently or semi-permanently such that the subscriber information is combined with a subscriber identifier, which, for example, is an IMSI in the GSM system. The CSCF of the IP telephony network has a signaling connection to the HSS.

In the first preferred embodiment of the invention, the access network comprises a service control function CSE_A for billing prepaid subscriptions. This network node responsible for billing can also be a network node of a third party, i.e. for instance the provider of a prepaid service. The event to be billed from an account of the prepaid subscription or from the subscriber of a subscription to be paid in arrears is not necessarily by any means related to the actual bearer service at all, but the account/subscription can be used for billing all kinds of services, i.e. for various billing events necessary for e.g. e-commerce. In the first preferred embodiment of the invention, it is assumed that the subscriber has a prepaid subscription to the operator of the access network and the operator of the access network, in turn, has bilateral billing-related contracts with IP telephony operators. The service control function CSE_A may comprise all service logic associated with prepaid subscription services and control associated with the service, and necessary databases for the service or a connection to the databases. The service control function is only a logical function and it can be internally implemented in different ways. An alternative is that it is internally decentralized and the related service logic can be decentralized in different nodes. Also the service information can be decentralized in different nodes from the service logic. In the first preferred embodiment of the invention, however, it is assumed for the sake of clarity that maintenance of the prepaid subscriptions' accounts and the necessary information are located in the same network node.

IP telephony is a general term which covers services from the standard voice telephony voice over IP VoIP to multimedia applications using IP data, voice and video in the IP telephony. In addition to the IP telephony, the above-described system supports other applications, such as access to the Internet or an intranet. Similarly, an IP call refers to a call which utilizes IP-based user information flow and signaling. The user information may comprise several different components, such as voice, video image and data. In addition to calls, the IP telephony may comprise call-like services, which can be unidirectional, directed to a group (or groups) or broadcast in a given area, for example. In the IP telephony, mobile communication systems utilize new protocols, such as a wireless application protocol WAP.

Figure 2:
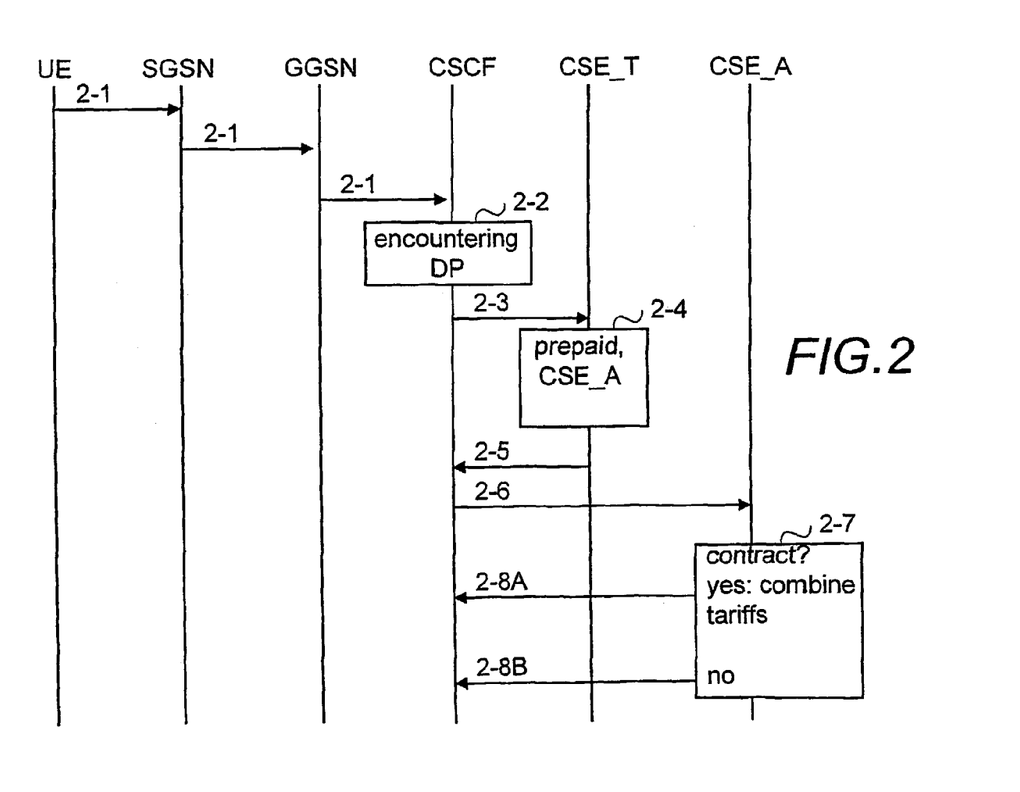
FIG. 2 is a signaling diagram showing a first preferred embodiment of the invention.
Figure 3:
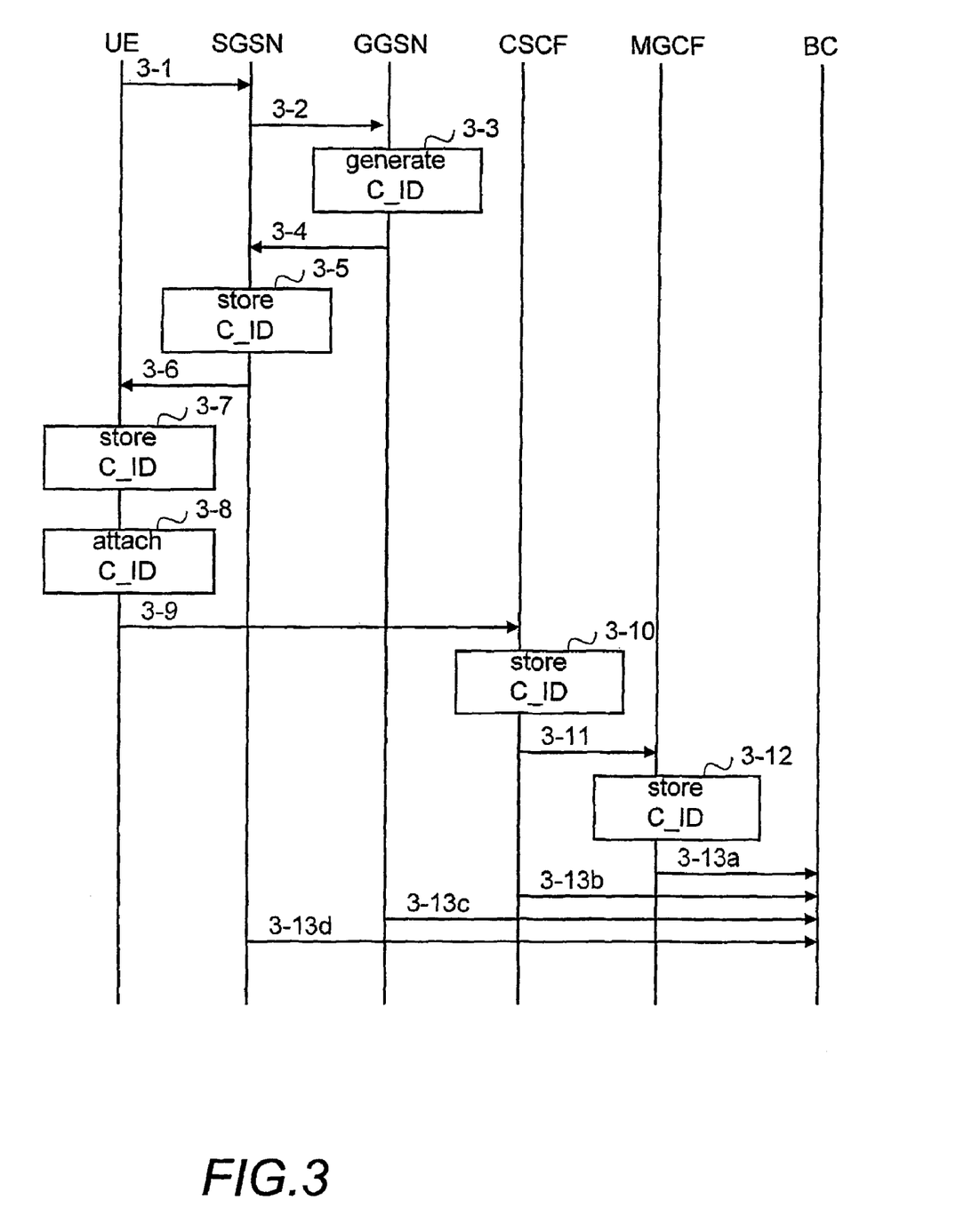
FIG. 3 is a signaling diagram showing a second preferred embodiment of the invention.
Figure 4:
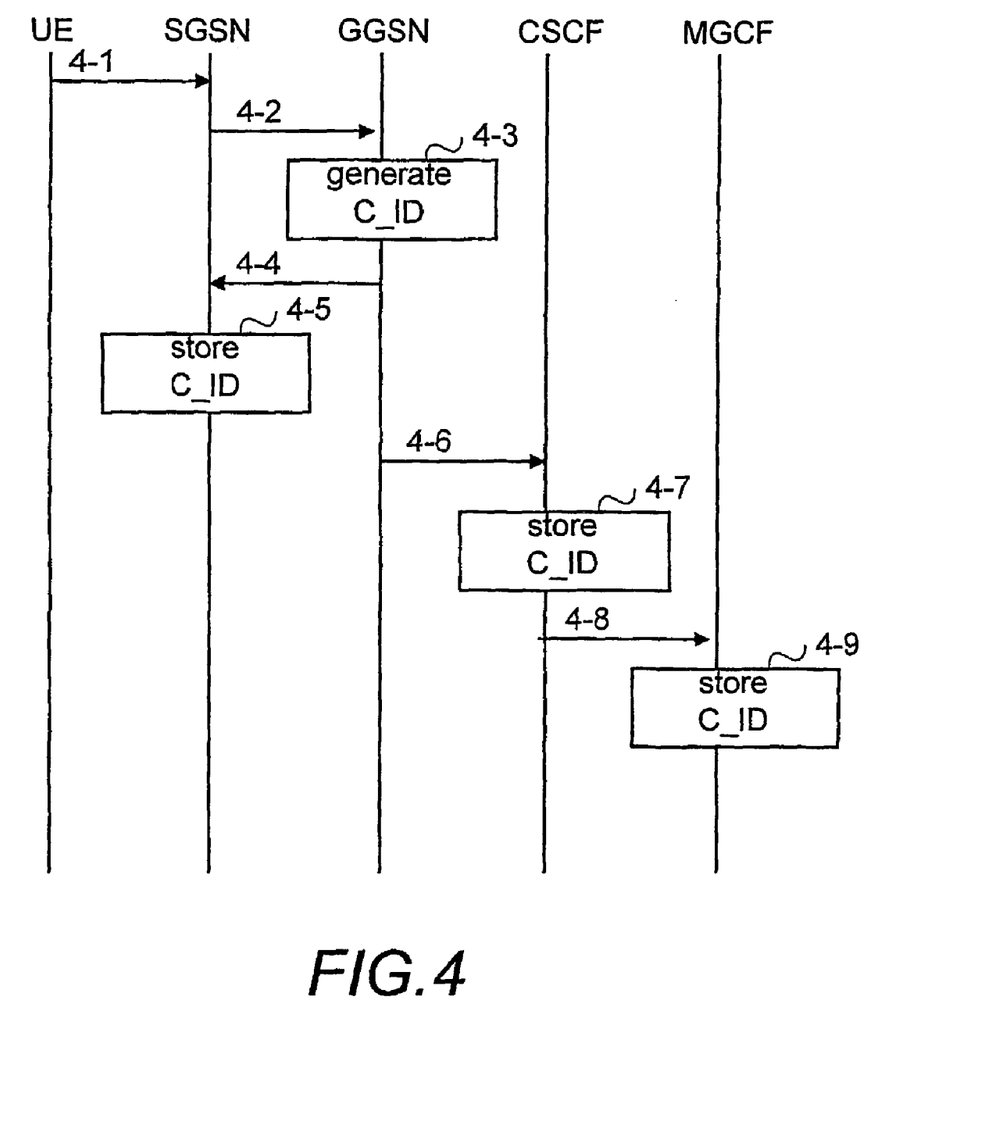
FIG. 4 is a signaling diagram showing a third preferred embodiment of the invention.

In addition to prior art means, a system and its network nodes implementing the functionality of the present invention comprise means for implementing functions described in closer detail in connection with FIG. 2, 3 or 4. To be more precise, they comprise either means for identifying a joint billing subscriber and for transmitting billing tariffs from a network to another and for billing the subscriber according to a billing tariff obtained by combining the billing tariffs of the two networks, or means for generating a global billing identifier and for transmitting the identifier to the nodes that collect billing information. It is also feasible that the system and its network nodes comprise all means mentioned above. In addition, the user equipment may comprise means for storing the global billing identifier and for transmitting the billing identifier to at least one of the networks. The existing network nodes and user equipment comprise processors and memory that can be utilized in the functions of the invention. All changes necessary for implementing the invention can be carried out as additional or updated software routines and/or by application circuits (ASIC).

FIG. 2 shows signaling according to the first preferred embodiment of the invention when a call using the IP telephony is made from the user equipment UE using a prepaid subscription. It is an example of services chargeable from the subscription of the user equipment, for which the functionality according to the first preferred embodiment of the invention can be utilized. In the example of FIG. 2, it is assumed that the user equipment has a subscription both to the access operator and the telephony operator but a prepaid account only to the access operator. The subscription to the telephony operator is used by the CSE_T to identify the subscription of the user equipment as a prepaid subscription. In other embodiments of the invention, the prepaid subscription can be identified in other ways and in these embodiments, the user equipment only needs a single subscription, preferably a subscription to the access operator. For the sake of clarity, it is assumed that the user equipment has made its presence known to the access network by performing a GPRS attach operation. In the GPRS attach procedure, the SGSN creates a mobility management MM context, and a logical link control LLC is provided between user equipment UE and the SGSN node at the protocol layer.

Furthermore, it is for the sake of clarity assumed that the user equipment UE has activated the PDP context, i.e. packet data address, it wishes to use. The PDP context specifies different data transfer parameters, such as a PDP type (X.25 or IP, for example), PDP address (IP address, for example), quality of service QoS and a network service access point identifier NSAPI. During the activation of the PDP context, the SGSN has encountered a subscriber-specific trigger (detection point), as the result of which it has requested context processing instructions from at least the service control function of the access operator which is responsible for maintaining the account of the prepaid subscription. The SGSN receives the address of the control function from, for example, the home subscriber server HSS, or it may have been set as a default value in the trigger. As the processing instructions, the SGSN receives from the control function CSE_A different threshold values, for example, such as a reporting condition by which the CSE_A requests an announcement from the SGSN when a certain amount of information has been transmitted from the user equipment UE when the billing is based on the transmitted amount of information. This exchange of information is not shown in FIG. 2.

Furthermore, it is for the sake of clarity assumed that the user equipment has registered itself in a CSCF and the call is routed to the CSCF. It is irrelevant to the invention how the CSCF is chosen during registration. In other embodiments of the invention, the call can be routed to another CSCF in which the user equipment is not registered.

In FIG. 2, the process starts when the user equipment UE transmits a connection setup request 2-1. The SGSN transmits the message to the GGSN, which transmits the call setup request 2-1 to the CSCF. Reception of the call setup request 2-1 results in encountering, at the CSCF, a trigger (Detection Point) to initiate the service, which causes the CSCF to transmit a request 2-3 for instructions to the service control function CSE_T of the telephony operator. The service control function CSE_T detects in step 24 that the call concerns a prepaid subscription, and the service control function CSE_A is responsible for the prepaid account of the prepaid subscription. In the first preferred embodiment of the invention, this information is located, for example, in the database of the CSE_T, or the operators may have a common database to use. In another preferred embodiment of the invention, the CSE_T may infer, on the basis of the telephone number of the caller, for example, that a prepaid subscription is at issue and request the address of the service control function CSE_A responsible for the prepaid account from the HSS via the CSCF.

Since the subscription is a prepaid subscription, the CSE_T sends, in a message 2-5, the tariff of the telephony operator and instructs the CSCF that the tariff of the telephony operator is to be transmitted to the CSE_A and all special events during the call are to be reported to the CSE_A. The message 2-5 preferably comprises the address of the CSE_A. After receiving the address 2-5, the CSCF transmits a message 2-6, which comprises the telephony operator tariff information and indicates the telephony operator to the CSE_A, to the CSE_A maintaining the account of the prepaid subscription. If no further intelligent-network-like controlling is associated with the service, the connection between the CSCF and the CSE_T is disconnected. After receiving the message 2-6, the CSE_A checks in step 2-7 whether the access operator and the telephony operator indicated by the message 2-6 have a billing-related contract.

If the operators have a mutual contract, the CSE_A combines the tariff of the telephony operator and the tariff of the access operator in order to charge the prepaid account according to the combined tariff. In addition, the CSE_A transmits an instruction to the CSCF in a message 2-8A to continue call establishment. The message 2-8A may also comprise other information related to the intelligent-network-like controlling, such as arming of detection points. The message 2-8A may also comprise, for example, reporting conditions or changes of previous reporting conditions. When the connection has been established, the prepaid account is charged according to the combined tariff mainly on the basis of information reported by the SGSN. If the CSCF detects a special event, i.e. an event which could not have been taken into account in tariff formation, it informs the CSE_A of the event so the CSE_A can acknowledge the event in the charging of the prepaid account. The access operator transmits the telephony operators share in the billing of the connection to the telephony operator, preferably in arrears.

If the operators do not have a mutual contract, the CSE_A informs the CSCF of this in a message 2-8B, whereafter the CSCF preferably terminates call establishment and informs the user equipment UE of the fact that the selected telephony operator cannot be used.

In a preferred embodiment of the invention, the tariff of the telephony operator is known in the CSCF. In this embodiment, the message 25 does not contain the tariff.

In a preferred embodiment of the invention, the CSE_A and the CSE_T may directly intercommunicate. In this embodiment, the CSE_T directly informs the CSE_A of the tariff of the telephony operator, and the CSE_A replies to the CSE_T with the message 2-8A or 2-8B. In this embodiment, messages 2-5 and 2-6 are unnecessary but the connection between the CSCF and the CSE_T cannot be disconnected. In this embodiment, the CSE_T transmits the information on special events to the CSE_A.

In a preferred embodiment of the invention, the prepaid subscription is a subscription to the telephony operator, in which case the CSE_T (or the like) is responsible for charging the prepaid subscription. In this embodiment, the CSE_T detects in step 24 that a connection setup request supplied via an access operator A is at issue and requests the access operator tariff information from the CSE_A (or a corresponding network node comprising the tariff information) in the messages 2-5 and 2-6 via the CSCF. The CSE_A returns the tariff information if the operators have a mutual contract, whereafter the CSE_T combines the tariffs and charges the account according to the combined tariff. In another embodiment, the contract information are located at the CSE_T and it requests the tariff information only if a contract exists. Yet in another preferred embodiment of the invention, the CSE_T comprises, besides the contract information, also the tariff of the access operator. In this embodiment, tariff information needs not be requested but it will suffice that the CSCF combines the tariff of the access operator with the tariff of the telephony operator. In this embodiment, when the tariff of the access operator changes, the change is updated in the CSE_T. This can be performed by utilizing automatic updating, for example.

Although in connection with FIG. 2 the first preferred embodiment with its different alternatives has been disclosed in connection with a prepaid subscription, it is obvious to one skilled in the art that the invention according to the first preferred embodiment can also be applied in connection with subscribers to be billed in arrears e.g. for producing a single bill to a subscriber and/or for monitoring a balance limit.

FIG. 3 shows signaling according to a second preferred embodiment of the invention. In the example of FIG. 3, it is for the sake of clarity assumed that the user equipment UE has a subscription to the access operator, which settles the bills between the operators if the telephony operator is not the same as the access operator. Each operator, in turn, settles with its service providers the billing related to the use of the services. In some other embodiments of the invention, the user may have a subscription both to the access operator and the telephony operator. For the sake of clarity, it is further assumed that the user equipment has made its presence known to the access network by carrying out a GPRS attach operation. In the GPRS attach procedure, the SGSN creates a mobility management MM context, and a logical link is provided between the user equipment UE and the SGSN node at the logical link control LLC protocol layer. Furthermore, it is assumed for the sake of clarity that the user equipment has been registered in the CSCF, and a call is routed to that CSCF. The way in which the CSCF is chosen in connection with the registration is irrelevant to the invention. In other preferred embodiments of the invention, a call may be routed to a CSCF in which the user equipment is not registered.

In FIG. 3, the process starts when the user equipment activates a PDP context, which, according to what has been disclosed above, determines different data transmission parameters, such as a PDP type (X.25 or IP, for example), PDP address (IP address, for example), quality of service QoS and a network service access point identifier NSAPI. Activation of the PDP context is started by transmitting a message 3-1 (Activate PDP Context Request) from the user equipment UE to the SGSN. Next, the SGSN and the user equipment may carry out security functions, e.g. authentication of the user equipment. These are not shown in FIG. 3. After receiving the message 3-1, the SGSN retrieves the address of the GGSN and transmits a message 3-2 (Create PDP Context Request) to the GGSN. In response to the message 3-2, in step 3-3 the GGSN generates a global billing identifier C_ID. The global billing identifier is preferably a combination of an integer identifying the PDP context in the GGSN and the address of the GGSN. The billing identifier thus formed is a globally unique one. Preferably, a running number is used as the identifying integer. Instead of the address of the GGSN, the address of another network element may also be used, the integer then preferably identifying the PDP context in the particular network element. The billing identifier may also be formed in other ways. The point in the second embodiment of the invention is that the billing identifier is unique in the system formed by different interacting networks such that call detail records relating to the same PDP context that are supplied to a billing center always contain the same billing identifier, which cannot be confused at the billing center with the billing identifiers used by other PDP contexts.

After generating the billing identifier C_ID (and after creating the information necessary for routing), the GGSN transmits a message 3-4 (Create PDP Context Response), which comprises the billing identifier C_ID as a new parameter. The SGSN separates the billing identifier C_ID from the message 34 and, in step 3-5, stores the billing identifier C_ID as the billing identifier to be used in this PDP context, and transmits the billing identifier C_ID to the user equipment UE in a message 3-6 (Activate PDP Context Accept) indicating that the activation of the PDP context has succeeded.

After receiving the message 3-6, in step 3-7 the user equipment UE stores the billing identifier C_ID as the billing identifier related to the particular PDP context. When the user desires a service from the network, e.g. to set up a call, in step 3-8 the user equipment attaches the billing identifier to a setup message 3-9 (Set up) and transmits the message 3-9- to the CSCF. In step 3-10, the CSCF stores the billing identifier in its memory to be used in the billing of this connection. The CSCF transmits the billing identifier to the MGCF in a message 3-11, and in step 3-12, the MGCF stores the billing identifier in its memory to be used in the billing of this connection.

FIG. 3 shows no other signaling related to connection setup. After the connection has been set up, certain network nodes (in the example of FIG. 3 the SGSN, GGSN, CSCF and MGCF) collect billing information, each transmitting call detail records CDR to a billing center BC in messages 3-13a, 3-13b, 3-13c, 3-13d. The call detail records comprise the billing identifier C_ID. Using the billing identifier C_ID, the billing center BC combines the call detail records supplied from the different network nodes into a sum to be billed from the subscriber. A prepaid account can also be charged each time after any of the messages 3-13a, 3-13b, 3-13c or 3-13d has been received, in which case combining the billing events means that each call detail record comprising the same billing identifier will charge a certain account. The correct account is found on the basis of the billing identifier. The billing center can be a separate center or e.g. a network node CSE_T charging the account of a prepaid subscription.

In the second preferred embodiment, the network nodes of the telephony operator (CSCF and MGCF) remove the billing identifier C_ID from their memory while the connection is being disconnected. In the second preferred embodiment, the user equipment UE and the network nodes of the access network (SGSN and GGSN) remove the billing identifier C_ID from their memory while the PDP context is being deactivated. Removing refers to the information no longer being available.

In a preferred embodiment utilizing the second embodiment of the invention, a joint billing subscriber is identified either in the GGSN or the SGSN, and the billing identifier is transmitted to the user equipment only if the subscriber is a joint billing subscriber. In this embodiment, the user equipment is arranged to attach the billing identifier to the message 3-9 only if it has received one in the message 3-6.

FIG. 4 shows signaling according to a third preferred embodiment of the invention. The same assumptions are made in the example of FIG. 4 as in the example of FIG. 3. Furthermore, it is assumed in the example of FIG. 4 that the interface between the access layer and the telephony layer is located between the GGSN and the CSCF.

In FIG. 4, the process starts when the user equipment UE starts activating the PDP context by transmitting a message 4-1 (Activate PDP Context Request) from the user equipment UE to the SGSN. Next, the SGSN and the user equipment may carry out security functions, e.g. authentication of the user equipment. These are not shown in FIG. 4. After receiving the message 4-1, the SGSN retrieves the address of the GGSN and transmits a message 4-2 (Create PDP Context Request) to the GGSN. In response to the message 4-2, in step 4-3 the GGSN generates a global billing identifier C_ID. The global billing identifier is described in closer detail in connection with FIG. 3.

After generating the billing identifier C_ID (and after creating the information necessary for routing), the GGSN transmits a message 44 (Create PDP Context Response), which comprises the billing identifier C_ID as a new parameter. The SGSN separates the billing identifier C_ID from the message 4-4 and, in step 4-5, stores the billing identifier C_ID as the billing identifier to be used in this PDP context. The GGSN also transmits the billing identifier C_ID to the CSCF a message 4-6. In step 4-7, the CSCF stores the billing identifier in its memory to be used in the billing of this transmission link. The CSCF transmits the billing identifier to the MGCF in a message 4-8, and in step 4-9, the MGCF stores the billing identifier in its memory to be used in the billing of this connection.

When a connection, e.g. a call, has then been set up from the user equipment, certain network nodes (in the example of FIG. 4 the SGSN, GGSN, CSCF and MGCF) collect billing information using the billing identifier C_ID determined for the transmission link used by the connection, each network node transmitting call detail records CDR to the billing center BC. The call detail records comprise the billing identifier C_ID. The transmission of the call detail records is not shown in FIG. 4. In the third preferred embodiment, the billing center BC operates in a similar manner to that shown in the second preferred embodiment in connection with FIG. 3; therefore, its operation will not be described in closer detail herein.

In the third preferred embodiment, the network nodes of the telephony operator (CSCF and MGCF) and the network nodes of the access network (SGSN and GGSN) remove the billing identifier C_ID from their memory while the PDP context is being deactivated. Removing refers to the information no longer being available.

In a preferred embodiment of the invention, the message 4-6 comprising the billing identifier C_ID is transmitted to the CSCF only when a connection is being set up from the user equipment.

In another preferred embodiment of the invention, the CSCF requests the billing identifier C_ID from the GGSN e.g. in response to receiving a setup message (message 3-9 in FIG. 3). In this embodiment, the GGSN is arranged to transmit the message 4-6 in response to the billing identifier C_ID request received from the CSCF.

If the interface between the access layer and the telephony layer is located somewhere else, the billing identifier C_ID is transmitted to the CSCF via this interface, which means that the message 4-6 shown in FIG. 4 is not needed but some other message/other messages is/are transmitted instead. If the interface is located e.g. between the HSS and the CSCF, the HSS can transmit the billing identifier to the CSCF. The HSS can be informed of the billing identifier either by the SGSN or the GGSN.

In preferred embodiments of the invention according to the second and third preferred embodiments, the global billing identifier is not generated in connection with activating the PDP context (transmission link) but only when the user of the user equipment desires a service from the network. In these embodiments, messages 3-1 and 3-2 or 4-1 and 4-2 are used for requesting generation of a billing identifier either directly or indirectly, and in the embodiment according to the second preferred embodiment, step 3-7 can be omitted since the user equipment merely relays the billing identifier generated in the network by the access operator to the network node(s) of the telephony operator. In these embodiments, the billing identifier is preferably removed from the memory of the network node while the connection is being disconnected.

It is also feasible that the billing identifier is generated in the network node of the telephony operator, from which it is transmitted either directly or via the user equipment to the network node(s) of the access network.

In a preferred embodiment utilizing the second and third embodiments of the invention, a joint billing subscriber is identified either in the GGSN or the SGSN, and the billing identifier is transmitted to the user equipment or the CSCF only if the subscriber is a joint billing subscriber. In such an embodiment utilizing the second embodiment, the user equipment is arranged to attach the billing identifier to the message 3-9 only if it has received one in the message 3-6.

The second and third embodiments (and embodiments derived therefrom) of the invention may also be used both in connection with subscriptions to be billed in arrears and balance-limited subscriptions to be billed in arrears and in connection with prepaid subscriptions as well.

Some or all signaling messages shown in FIGS. 3 and 4 may be e.g. messages based on GPRS tunneling protocol GTP, H.323 and/or session initiation protocol SIP protocols.

The signaling messages and steps shown in FIGS. 2, 3 and 4 are not shown in absolute chronological order and they can be implemented in a different order from the given one. Other signaling messages can be transmitted and/or other functions can be carried out between the messages and/or steps. For example, in the second preferred embodiment of the invention, it can be checked in step 3-9 whether the operators have a contract enabling joint billing, and the process can continue as shown in FIG. 3 when such a contract exists. Some steps shown in FIGS. 2 and 3 can also be omitted. If, for example, in the first preferred embodiment of the invention the same operator is both the telephony operator and the access operator, the CSE_T and the CSE_A can be the same service control point, in which case in step 2-4, the CSE_T detects that it is itself responsible for the account of the prepaid subscription, so no message 2-5 will be transmitted but the tariffs are combined as shown in step 2-7. No message 2-6 will then be transmitted either. The signaling messages are only examples and they may comprise several separate messages for transmitting the same information. Furthermore, the messages may also comprise other information. The names of the messages may also differ from those disclosed above.

It is to be understood that the above description and the related figures are only intended to illustrate the present invention. Different variations and modifications of the invention will be obvious to one skilled in the art without deviating from the scope and spirit of the invention disclosed in the attached claims.

The invention claimed is:
1. A method, comprising:
receiving in a first network a connection establishment request for a connection, the connection being through a network node of the first network to a second network such that the network node routes communications to the second network;
generating, in response to at least the received connection establishment request, a connection-specific billing identifier for the connection in the first network in association with activating a packet data protocol context or in association with session initiation protocol messaging;
adding the billing identifier to the received connection establishment request;
causing, after adding the billing identifier, the received connection establishment request comprising the billing identifier to be forwarded to network nodes of the second network that collect billing information for the connection;
attaching, in each node that collects billing information, the connection-specific billing identifier to the billing information collected for the connection; and
combining the pieces of the billing information collected by different nodes that comprise the same connection-specific billing identifier, wherein a user terminal desiring a service uses both the first network and the second network in the telecommunication system, both networks comprising at least one node configured to collect billing information.

2. The method of claim 1, further comprising:
causing the connection establishment request comprising the connection-specific billing identifier to be forwarded from the first network to the second network via an interface between the networks.

3. The method of claim 1, wherein at least an integer and the address of one network element is used for forming the connection-specific billing identifier.

4. A method comprising:
causing a connection establishment request to be sent from a user terminal to a first network, wherein the connection establishment request requests a connection, the connection being through a network node of the first network to a second network such that the network node routes communications to the second network;
receiving a connection-specific billing identifier in the user terminal, the connection-specific billing identifier being generated in the first network in association with activating a packet data protocol context or in association with session initiation protocol messaging;
requesting activation of a transmission link, wherein requesting activation includes causing the connection-specific billing identifier to be provided to the second network; and
attaching the connection-specific billing identifier to a service request supplied from the user terminal to the second network on the transmission link to establish the connection to the second network.

5. The method of claim 4, further comprising: causing the connection-specific billing identifier to be maintained in the user terminal as long as the transmission link is active.

6. A system, comprising:
a first network and a second network configured to provide a subscriber with a service, each of the first network and the second network comprising at least one node to collect billing information,
wherein the system is configured to:
generate a connection-specific billing identifier for a connection in association with activating a packet data protocol context or in association with session initiation protocol messaging, wherein the connection-specific billing identifier is generated in the first network and in response to at least a connection establishment request received from a user terminal for a connection, wherein the connection is through a network node of the first network to the second network such that the network node routes communications to the second network,
add the billing identifier to the received connection establishment request,
cause the connection-specific billing identifier to be transmitted by causing forwarding of the received connection establishment request comprising the billing identifier to one of the at least one node of the second network that collects billing information, and
combine the pieces of billing information for the connection that comprise the same connection-specific billing identifier;
wherein the at least one node of the first network and second network that collects billing information are configured to attach the connection-specific billing identifier to the billing information for the connection.

7. The system of claim 6, wherein the connection-specific billing identifier is generated in one of the at least one node of the first network that collects billing information.

8. The system of claim 6, further configured to transmit the connection-specific billing identifier from the first network to the second network via an interface between the first and the second networks.

9. The system of claim 6, further configured to generate the connection-specific billing identifier in such a way that the generated connection-specific billing identifier comprises the address of a network node in the first network and an integer.

10. A system, comprising:
a first network and a second network configured to provide a subscriber with a service, each of the first network and the second network comprising at least one node to collect billing information;
wherein the first network is an access network, and in order to use the access network the subscriber must activate a packet data address;
wherein the system is configured to:
generate a connection-specific billing identifier in association with activating a packet data protocol context or in association with session initiation protocol messaging, a connection associated with the connection-specific billing identifier being established through a network node of the first network to a second network such that the network node routes communications to the second network,
cause, during the connection establishment, the billing identifier to be transmitted to the second network and the at least one node of the second network that collects billing information, and
combine pieces of billing information for the connection that comprise the same connection-specific billing identifier; and
wherein the at least one node of the first network and the second network to collect billing information are configured to attach the connection-specific billing identifier to the billing information for the connection.

11. The system of claim 10, further configured to cause the connection-specific billing identifier to be transmitted from the first network to the second network via user equipment.

12. An apparatus comprising at least one processor and at least one memory including computer program code, the at least one memory and the computer program code configured to, with the at least one processor, cause the apparatus at least to:
receive a connection-specific billing identifier for a connection from a first network in response to at least a connection establishment request to establish the connection, the connection-specific billing identifier being received in association with activating a packet data protocol context or in association with session initiation protocol messaging the connection being through a network node of the first network to a second network such that the network node routes communications to the second network; and
direct transmission of the connection establishment request with the connection-specific billing identifier to the second network in a request for obtaining a service over the connection to be established in response to at least the connection establishment request,
wherein the apparatus is caused to function in a telecommunication system which comprises the first network and the second network to provide a subscriber with the service, each of the first network and second network comprising at least one node to collect billing information for the connection.

13. The apparatus of claim 12, wherein the apparatus caused to receive the connection-specific billing identifier includes being caused to receive the connection-specific billing identifier in connection with activation of a packet data address between the user equipment and the first network.

14. The apparatus of claim 12, wherein the at least one memory is configured to store the connection-specific billing identifier.

15. An apparatus, comprising:
generating means for generating, in response to at least receiving a connection establishment request for a connection, a connection-specific billing identifier to be used for combining billing information for the connection, the connection-specific billing identifier being generated in association with activating a packet data protocol context or in association with session initiation protocol messaging, the connection being through a network node of a first network to a second network such that the network node routes communications to the second network; and
including means for including the connection-specific billing identifier into the received connection establishment request before forwarding the received connection establishment request to facilitate billing for the connection using the connection-specific billing identifier in the first network and the second network.

16. An apparatus, comprising:
collecting means for facilitating the collecting of billing information for a connection, the connection being through a network node of a first network to a second network such that the network node routes communications to the second network;
receiving means for receiving, in the second network, a connection establishment request comprising a connection-specific billing identifier for the connection in association with activating a packet data protocol context or in association with session initiation protocol messaging; and
storing means for causing storing of the connection-specific billing identifier to be used in billing for the connection.

17. An apparatus comprising at least one processor and at least one memory including computer program code, the at least one memory and the computer program code configured to, with the at least one processor, cause the apparatus at least to:
generate, in response to at least a connection establishment request for a connection, a connection-specific billing identifier for the connection in association with activating a packet data protocol context or in association with session initiation protocol messaging, the connection-specific billing identifier to be used to combine billing information relating to the connection in a multi-network communication system, the connection being through a network node of a first network to a second network such that the network node routes communications to the second network, and
include the connection-specific billing identifier into the connection establishment request before causing forwarding of the connection establishment request for the connection that caused the billing identifier to be generated to facilitate billing for the connection using the connection-specific billing identifier in the first network and the second network.

18. The apparatus of claim 17, wherein the apparatus is further caused to:
collect billing information for the connection for the first network; and
cause the billing information for the connection for the first network to be provided to a billing center for combination with billing information for the connection for the second network.

19. A method, comprising:
receiving a connection establishment request for a connection, the connection being through a network node of a first network to a second network such that the network node routes communications to the second network;
generating, in response to at least the received connection establishment request, a connection-specific billing identifier for the connection to be used for combining billing information for the connection in association with activating a packet data protocol context or in association with session initiation protocol messaging;
including the billing identifier into the received connection establishment request; and
causing, after including the billing identifier in the received connection establishment request, the received connection establishment request to be forwarded to facilitate billing for the connection using the connection-specific billing identifier in the first network and the second network.

20. The method of claim 19 further comprising:
collecting billing information for the connection for the first network; and
causing the billing information for the connection for the first network to be provided to a billing center for combination with billing information for the connection for the second network.

21. An apparatus comprising at least one processor and at least one memory including computer program code, the at least one memory and the computer program code configured to, with the at least one processor, direct the apparatus at least to:
receive a message comprising a connection-specific billing identifier for a connection, the connection-specific billing identifier being generated in association with activating a packet data protocol context or in association with session initiation protocol messaging, the connection being through a first network to a second network such that communications are routed from the first network to the second network, and wherein the message further comprises a piece of billing information for the connection from a network node; and
combine the piece of billing information with another received piece of billing information using the connection-specific billing identifier.

22. A method comprising:
receiving a message comprising a connection-specific billing identifier for a connection, the connection-specific billing identifier being generated in association with activating a packet data protocol context or in association with session initiation protocol messaging, the connection being through a first network to a second network such that communications are routed from the first network to the second network, and wherein the message further comprises a piece of billing information for the connection from a network node; and
combining the piece of billing information with another received piece of billing information using the connection-specific billing identifier.

23. A method comprising:

causing billing information to be collected for a connection, the connection being through a network node of a first network to a second network such that the network node routes communications to the second network;

receiving, in the second network, a connection establishment request comprising a connection-specific billing identifier for the connection in association with activating a packet data protocol context or in association with session initiation protocol messaging; and causing the connection-specific billing identifier to be used in billing for the connection to be stored.

24. An apparatus comprising at least one processor and at least one memory including computer program code, the at least one memory and the computer program code configured to, with the at least one processor, cause the apparatus at least to:

cause billing information to be collected for a connection, the connection being through a network node of a first network to a second network such that the network node routes communications to the second network;

receive, in the second network, a connection establishment request comprising a connection-specific billing identifier for the connection in association with activating a packet data protocol context or in association with session initiation protocol messaging; and cause the connection-specific billing identifier to be used in billing for the connection to be stored.

\* \* \* \* \*

UNITED STATES PATENT AND TRADEMARK OFFICE
CERTIFICATE OF CORRECTION

| | | |
|---|---|---|
| PATENT NO. | : 8,009,816 B2 | Page 1 of 1 |
| APPLICATION NO. | : 10/296477 | |
| DATED | : August 30, 2011 | |
| INVENTOR(S) | : Syrjala et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 596 days.

Signed and Sealed this

Thirty-first Day of January, 2012

David J. Kappos
*Director of the United States Patent and Trademark Office*